(12) United States Patent
Kwag et al.

(10) Patent No.: US 6,624,256 B2
(45) Date of Patent: Sep. 23, 2003

(54) METHOD OF PREPARATION OF SILOXANE-FUNCTIONALIZED HIGH 1,4-CIS POLYBUTADIENE

(75) Inventors: Gwanghoon Kwag, Taejeon (KR); Aju Kim, Taejeon (KR); Seunghwon Lee, Taejeon (KR)

(73) Assignee: Korea Kumho Petrochemical Co. Ltd., Seoul (KR)

( * ) Notice: Subject to any disclaimer, the term of this patent is extended or adjusted under 35 U.S.C. 154(b) by 0 days.

(21) Appl. No.: 10/035,498

(22) Filed: Nov. 9, 2001

(65) Prior Publication Data

US 2002/0137843 A1 Sep. 26, 2002

(30) Foreign Application Priority Data

Jan. 22, 2001 (KR) .......................................... 2001-3530

(51) Int. Cl.[7] ............................................... C08C 19/25
(52) U.S. Cl. ........................ 525/342; 502/118; 502/202; 502/232; 526/348.6; 526/135; 528/14
(58) Field of Search ................................ 502/118, 202, 502/232; 526/348.6, 135; 528/14; 525/342

(56) References Cited

U.S. PATENT DOCUMENTS

| 3,928,490 A | | 12/1975 | Hergennother |
| 4,906,706 A | * | 3/1990 | Hattori et al. |
| 4,906,786 A | | 3/1990 | Kelsey |

FOREIGN PATENT DOCUMENTS

| EP | 713886 | 1/1997 |

* cited by examiner

Primary Examiner—Robert Dawson
Assistant Examiner—Kuo Liang Peng
(74) Attorney, Agent, or Firm—Davidson, Davidson & Kappel, LLC

(57) ABSTRACT

Disclosed is a method of preparation of a siloxane-functionalized high 1,4-cis polybutadiene using a siloxane compound, in which the siloxane group expands the usage of the high 1,4-cis polybutadiene.

18 Claims, 1 Drawing Sheet

METHOD OF PREPARATION OF SILOXANE-FUNCTIONALIZED HIGH 1,4-CIS POLYBUTADIENE

BACKGROUND OF THE INVENTION

1. Field of the Invention

The present invention relates to a preparation method of high 1,4-cis polybutadienes using a siloxane compound and, more particularly, to a preparation method of high 1,4-cis polybutadienes that includes polymerization of 1,3-butadiene or butadiene derivatives using a catalyst in the presence of a non-polar solvent to prepare polybutadiene having a high 1,4-cis content of more than 95%, and then siloxane-functionalization of the polybutadiene using a siloxane compound, the catalyst comprising 1) rare earth compound, 2) halogen-containing compound and 3) organoaluminum compound.

2. Description of the Related Art

Methods for synthesizing and functionalizing high 1,4-cis polybutadiene using a rare earth catalyst are disclosed in U.S. Pat. No. 4,906,706 and EP 713 886, in which use is made of a catalyst system comprising a neodymium (Nd) carboxylate compound, an alkyl aluminum compound and a Lewis acid in the presence of a non-polar solvent to prepare high 1,4-cis polybutadiene, and then high 1,4-cis polybutadiene is functionalized using an organic compound such as epoxy or an inorganic compound such as tin halide.

Block copolymers of low cis polybutadiene and polysiloxane were disclosed in U.S. Pat. No. 3,928,490, where the low cis polybutadiene was prepared through anionic polymerization using organolithium. Wherein, the term "low cis polybutadiene" means the content of cis in the cis polybutadiene is 20 to 50%.

Currently, high 1,4-cis polybutadiene is primarily used for tire treads and seriously required for higher compatibility with silica used as reinforcement for high-performance tires. Furthermore, mixing high 1,4-cis polybutadiene with silica takes much time with consumption of high energy and needs addition of a binder, since hydrophilic silica is incompatible with high 1,4-cis polybutadienes that is hydrophobic.

As used herein, the following term is intended to have the meaning as understood by persons of ordinary skill in the art, and is specifically intended to include the meaning set forth below:

As used herein, the term "high 1,4-cis polybutadiene" means the content of cis in the 1,4-cis polybutadiene is more than 95%.

SUMMARY OF THE INVENTION

Accordingly, the inventors contrived to functionalize high 1,4-cis polybutadiene with siloxy groups to prepare high 1,4-cis polybutadiene that has a high compatibility with silica for high-performance tires.

It is therefore an object of the present invention to provide high 1,4-cis polybutadiene having siloxy end group and, more particularly, to provide siloxane-functionalized high 1,4-cis polybutadienes using a neodymium catalyst in addition 1,3-butadiene polymerization.

To achieve the object of the present invention, there is provided a preparation method of a siloxane-functionalized high 1,4-cis polybutadiene that includes: a step of polymerizing 1,3-butadiene or 1,3-butadiene derivatives using a catalyst in the presence of a non-polar solvent to yield a high 1,4-cis polybutadiene, the catalyst comprising 1) a rare earth compound, 2) a halogen-containing compound, and 3) an organoaluminum compound; and a step of reacting the allylic chain-end with a siloxane compound represented by the Formulas I or II:

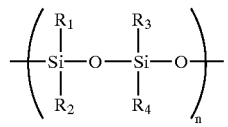
Formula I

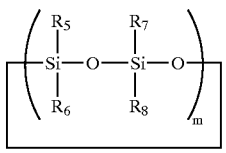
Formula II where $R_1$ to $R_8$ are the same or different and include halogen, or $C_1$ to $C_{20}$ alkyl or aryl group as substituent and n and m are integer of 1 to 20.

Now, the present invention will be described in further detail as follows.

The present invention is directed to a preparation method of a siloxane-functionalized high 1,4-cis polybutadiene using a siloxane compound.

The preparation method of a siloxane-functionalized 1,4-cis polybutadiene according to the present invention includes a step of polymerizing a 1,3-butadiene or 1,3-butadiene derivatives using a non-polar solvent in the presence of a catalyst comprising a halogen-containing compound, an organoaluminum compound and a neodymium carboxylate to prepare a high 1,4-cis polybutadiene, and a step of functionalizing the high 1,4-cis polybutadiene with a siloxane compound.

The catalyst as used herein has the following composition.

1) Neodymium Compound

The rare earth compound can be a rare earth salt comprising an organic acid or an inorganic acid. Especially, the rare earth salt comprising an organic acid is preferred due to its high solubility in an organic solvent. Carboxylate is the most preferred. The carboxylic acid of the carboxylate as used herein have a $C_8$ to $C_{20}$ saturated, unsaturated, ring or linear structure and may include, for example, octanoic acid, naphthenic acid, versatic acid or stearic acid. Examples of the rare earth carboxylate may include neodymium versatate, neodymium octoate, or neodymium naphthenate.

The used amount of the neodymium compound is preferably 0.5 to $50 \times 10^{-4}$ mole per 100 g of butadiene.

2) Halogen-Containing Compound

In the catalyst system of the present invention, the halogen-containing compound includes halogen-containing Lewis acid and halogen-donating organohalogen compound. Examples of the halogen-containing Lewis acid may include aluminum compound represented by the formula, a $AlX_nR^1_{3-n}$, $BX_nR^1_{3-n}$, $SiX_nR^1_{4-n}$, $SnX_nR^1_{4-n}$ and $TiX_nR^1_{14-n}$, wherein $R^1$ is hydrogen, or an aryl or alkyl group containing 1 to 10 carbon atoms; X is a halogen atom; and n is a integer of 1 or 2.

Among these organohalogen compounds, t-alkylhalogen compounds such as t-butylhalogen are preferred.

3) Organoaluminum Compound

Organoaluminum compound is represented by the formula, $AlR^2_3$, $R^2$ is hydrogen or an alkyl or aryl group containing 1 to 10 carbon atoms.

Specific examples of the organoaluminum compound include trimethylaluminum, triethylaluminum, tripropylaluminum, tributylaluminum, triisobutylaluminum, trihexylaluminum and diisobutylaluminum hydride.

In the above catalyst system, the mole ratio of neodymium to chlorine is preferably in the range of 1:1 to 1:20, the mole ratio of neodymium to alkyaluminum being in the range of 1:20 to 1:100.

To enhance the electron donating ability, the rare earth catalyst system of the present invention may include Lewis bases such as organic amine or organo phosphorus. Specific examples of the Lewis base may include tetramethylethylenediamine, triethylamine, triphenylphosphine, tributylphosphine, or tetrahydrofurane.

1,3-butadiene derivatives as used herein as a monomer may include isoprene, 1,3-pentadiene, 2,3-dimethyl-1,3-butadiene, and myrcene, wherein the myrcene is a dimer of isoprene.

High 1,4-cis polybutadiene having cis content of more than 95% and weight-average molecular weight ($M_w$) of 100,000 to 2,000,000 can be prepared.

The solvent of the catalyst must be a non-polar solvent that is inert to the catalyst. Specific examples of the solvent include cyclohexane, hexane, or heptane.

1,3-Butadiene can be added during the catalyst-aging step. The addition of 1,3-butadiene during the aging step is effective in maintaining the activity of the catalyst, inhibiting precipitation and affecting the physical properties of the rubber.

For aging of the catalyst, the individual components of the catalyst can be added to a catalyst reactor in nitrogen atmosphere in the order of a neodymium catalyst solution, a halogen-containing aluminum compound and an organoaluminum compound, which order may be altered depending on the process. The solvent as used herein is a non-polar solvent such as cyclohexane, hexane, heptane or toluene, and can be directly added to the reactor without a separate aging step.

The catalyst-aging conditions, such as temperature and time may have an effect on the properties of the product. Preferably, the aging time is 5 minutes to 2 hours, the aging temperature being −30 to 60° C.

The polymerization solvent as used herein must be removed of oxygen and water. Specific examples of the non-polar polymerization solvent may include at least one aliphatic hydrocarbon such as butane, pentane, hexane, isopentane, heptane, octane, or isooctane; cycloaliphatic solvents such as cyclopentane, methylcyclopentane, cyclohexane, methylcyclohexane, or ethylcyclohexane; and aromatic hydrocarbon such as benzene, toluene, ethylbenzene or xylene. The polymerization solvent can be directly used in the polymerization reaction of 1,3-butadiene only when it is removed of oxygen and water.

The polymerization reaction is carried out in high-purity nitrogen atmosphere and reaction temperature is preferably in the range from −20 to 100° C. Under adequate catalytic conditions, the reaction time is preferably 30 minutes to 7 hours to achieve a yield of more than 70%.

As described above, addition of a siloxane compound represented by the formulas I and II to the reaction mixture introduces a siloxane end group. The examples of the siloxane compound having the formulas I and II may include, if not specifically limited to, pentamethyl siloxane compound, 1,3,5,7-tetramethylcyclotetrasiloxane compound, 1,1,3,3-tetraisopropyldisiloxane compound, 1,1,3,3,5,5-hexamethylcyclotrisilazane compound, 1,2,3,4,5,6-hexamethylcyclotrisilazane compound, cyclotrimethylenedimethylsilane and methylsilatrane.

The added amount of the siloxane compound is about 0.1 to 10 parts by weight based on the neodymium catalyst. If the amount of the siloxane compound exceeds 10 parts by weight, gelation may occur.

The product is obtained through precipitation in methyl alcohol and then analyzed in regard to the identification of a siloxane group with an infrared spectrometer and an NMR (Nuclear Magnetic Resonance) instrument.

DETAILED DESCRIPTION OF THE PREFERRED EMBODIMENT

Figure 1:
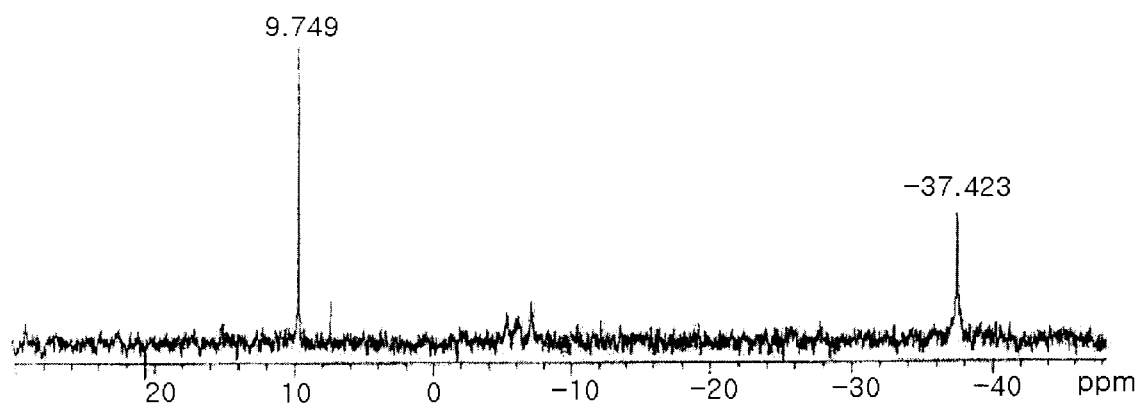
FIG. 1 shows identification of a siloxane group in a dried polymer prepared according to Example 1 of the present invention by means of a $^{29}$Si-NMR (Nuclear Magnetic Resonance) instrument.

Hereinafter, the present invention will be described in detail by way of the following examples, which are not intended to limit the scope of the present invention.

EXAMPLE 1

$1.6 \times 10^{-3}$ mole of the Ziegler-Natta catalyst was used based on 100 g of 1,3-butadiene, the Ziegler-Natta catalyst comprising neodymium versatate (1.0% cyclohexane solution), diethyl aluminum chloride and triisobutyl aluminum (15% n-hexane solution) at the molar ratio of 1:3:40. The used amount of solvent was five times as much as the content of the monomer.

To a 400-mL pressure glass reactor filled with sufficient nitrogen were added predetermined amounts of cyclohexane and butadiene (30 g), neodymium versatate, diethyl aluminum chloride and triisobutyl aluminum. After 30 minutes of polymerization reaction, pentamethyl siloxane compound (0.3 mL) was added to the reaction mixture. In another 30 minutes, methanol was added to terminate the reaction.

Subsequent to the step of drying the polymer thus produced, the siloxane group of the polymer was identified with a $^{29}$Si-NMR (Nuclear Magnetic Resonance) spectroscopy (−34.7 ppm). The results are presented in FIG. 1.

EXAMPLE 2

The procedures were performed in the same manner as described in Example 1, excepting that the modifier was 1,3,5,7-tetramethylcyclotetrasiloxane compound (0.5 mL).

EXAMPLE 3

The procedures were performed in the same manner as described in Example 1, excepting that the modifier was 1,1,3,3-tetraisopropyldisiloxane compound (0.6 mL).

EXAMPLE 4

The procedures were performed in the same manner as described in Example 1, excepting that the modifier was 1,1,3,3,5,5-hexamethylcyclotrisilazane compound (0.5 mL).

EXAMPLE 5

The procedures were performed in the same manner as described in Example 1, excepting that the monomer was isoprene.

TABLE 1

| Example | Composition of Catalyst | Nd Conc. (mol) | Mole Ratio (Nd/Cl/Al) | Modifier |
|---|---|---|---|---|
| 1 | NdH(versatate)$_4$/ Et$_2$AlCl/TIBA | 1.6 × 10$^{-3}$ | 1:3.0:40 | Pentamethylsiloxane |
| 2 | NdH(versatate)$_4$/ Et$_2$AlCl/TIBA | 1.6 × 10$^{-3}$ | 1:3.0:40 | 1,3,5,7-tetramethyl-cyclotetrasiloxane |
| 3 | NdH(versatate)$_4$/ Et$_2$AlCl/TIBA | 1.6 × 10$^{-3}$ | 1:3.0:40 | 1,1,3,3-tetraisopropyl-disiloxane |
| 4 | NdH(versatate)$_4$/ Et$_2$AlCl/TIBA | 1.6 × 10$^{-3}$ | 1:3.0:40 | 1,1,3,3,5,5-hexamethyl-cyclotrisilazane |
| 5 | NdH(versatate)$_4$/ Et$_2$AlCl/TIBA | 1.6 × 10$^{-3}$ | 1:3.0:40 | 1,2,3,4,5,6-hexamethyl-cyclotrisilazane |

NdH(versatate)$_4$ = neodymium versatate
Et$_2$AlCl = diethyl aluminum chloride
TIBA = triisobutylaluminum hydride = Al(iBu)$_3$

TABLE 2

| Example | Reaction Time (min) | Reaction Temp. (° C.) | Yield (%) | Cis cont. (%) | $M_w^{(1)}$ (× 10$^4$) | MWD$^{(2)}$ | IR (3500 cm$^{-1}$) |
|---|---|---|---|---|---|---|---|
| 1 | 60 | 40 | 95 | 96.4 | 1.08 | 3.46 | Observed |
| 2 | 60 | 40 | 98 | 96.2 | 3.15 | 7.50 | Observed |
| 3 | 60 | 40 | 94 | 96.4 | 1.23 | 3.80 | Observed |
| 4 | 60 | 40 | 97 | 96.4 | 0.95 | 4.66 | Observed |
| 5 | 60 | 40 | 95 | 96.6 | 7.30 | 5.30 | Observed |

$^{(1)}$M$_w$: Weight-Average Molecular Weight
$^{(2)}$MWD: Molecular Weight Distribution As described above, the present invention makes the user of a siloxane compound to introduce a siloxane end group and thereby prepare high 1,4-cis polybutadienes and expands the usage of the 1,4-cis polybutadienes, especially as a silica-compatible rubber possessing high abrasion resistance.

What is claimed is:

1. A method for preparation of siloxane-functionalized high 1,4-cis polybutadiene comprising:

polymerizing of 1,3-butadiene or 1,3-butadiene derivatives using a catalyst in the presence of non-polar solvent to yield high 1,4-cis polybutadiene, the catalyst comprising 1) rare earth compound, 2) halogen-containing compound, and 3) organoaluminum compound; and reacting high 1,4-cis polybutadiene with a siloxane compound represented by the formulas I or II to siloxane-functionalized high 1,4-cis polybutadiene:

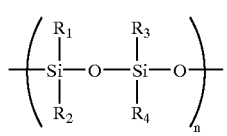

Formula I where R$_1$ to R$_4$ are the same or different and include halogen, or C$_1$ to C$_{20}$ alkyl or aryl group and n is an integer of 1 to 20,

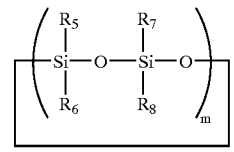

Formula II where R$_5$ to R$_8$ are the same or different and include halogen, or C$_1$ to C$_{20}$ alkyl or aryl group and m is a integer of 1 to 20.

2. The method as claimed in claim 1, wherein the 1,3-butadiene derivatives include at least one compound selected from the group consisting of isoprene, 1,3-pentadiene, 2,3-dimethyl-1,3-butadiene and myrcene.

3. The method as claimed in claim 1, wherein the rare earth compound includes a rare earth salt comprising an organic acid or an inorganic acid.

4. The method as claimed in claim 3, wherein the rare earth salt includes a rare earth carboxylate.

5. The method as claimed in claim 4, wherein the carboxylic acid of the rare earth carboxylate is selected from the group consisting of octoic acid, naphthenic acid, versatic acid, and stearic acid.

6. The method as claimed in claim 3, wherein the rare earth salt comprising an organic acid is selected from the group consisting of neodymium versatate, neodymium octoate and neodymium naphthenate.

7. The method as claimed in claim 4, wherein the rare earth carboxylate is selected from the group consisting of neodymium versatate, neodymium octoate and neodymium naphthenate.

8. The method as claimed in claim 1, wherein the halogen-containing compound is selected from AlX$_n$R$^1_{3-n}$, BX$_n$R$^1_{3-n}$, SiX$_n$R$^1_{4-n}$, SnX$_n$R$^1_{4-n}$ and TiX$_n$R$^1_{4-n}$, wherein R$^1$ is hydrogen, or an aryl or alkyl group containing 1 to 10 carbon atoms; X is a halogen atom; and n is a integer of 1 or 2.

9. The method as claimed in claim 1, wherein the halogen-containing compound includes a t-alkyl halogen compound.

10. The method as claimed in claim 8, wherein the halogen-containing compound includes a t-alkyl halogen compound.

11. The method as claimed in claim 1, wherein the organoaluminum compound is represented by the formula, AlR$^2_3$, R$^2$ is hydrogen or an alkyl or aryl group containing 1 to 10 carbon atoms.

12. The method as claimed in claim 1, wherein the organoaluminum compound includes at least one selected from trimethylaluminum, triethylaluminum, tripropylaluminum, tributylaluminum, triisobutylaluminum, trihexylaluminum and diisobutylaluminum hydride.

13. The method as claimed in claim 11, wherein the organoaluminum compound includes at least one selected from trimethylaluminum, triethylaluminum, tripropylaluminum, tributylaluminum, triisobutylaluminum, trihexylaluminum and diisobutylaluminum hydride.

14. The method as claimed in claim 1, wherein the non-polar solvent includes at least one selected from butane, pentane, hexane, isopentane, heptane, octane, isooctane, cyclopentane, methylcyclopentane, cyclohexane, methylcyclohexane, ethylcyclohexane, benzene, toluene, ethylbenzene and xylene.

15. The method as claimed in claim 1, wherein the catalyst has a mole ratio of a rare earth element to chlorine in the range of 1:1 to 1:20.

16. The method as claimed in claim 1, wherein the catalyst has a mole ratio of a rare earth element to alkyaluminum in the range of 1:20 to 1:100.

17. The method as claimed in claim 1, wherein the reaction time is 30 minutes to 7 hours.

18. The method as claimed in claim 1, wherein the reaction temperature is −20 to 200° C.

* * * * *